(12) United States Patent
Tineo et al.

(10) Patent No.: US 11,663,575 B2
(45) Date of Patent: May 30, 2023

(54) TIME SENSITIVE GEO-LOCATION DATA FOR PUSH NOTIFICATIONS AFTER SHARED TRANSACTION PROCESSING

(71) Applicant: PAYPAL, INC., San Jose, CA (US)

(72) Inventors: Brandon Alexander Tineo, Mountain View, CA (US); Lorenz Lee Breu, Palo Alto, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/099,507

(22) Filed: Nov. 16, 2020

(65) Prior Publication Data

US 2021/0073783 A1 Mar. 11, 2021

Related U.S. Application Data

(63) Continuation of application No. 15/855,437, filed on Dec. 27, 2017, now Pat. No. 10,839,367.

(51) Int. Cl.
| | |
|---|---|
| *G06Q 20/32* | (2012.01) |
| *H04W 4/08* | (2009.01) |
| *G06Q 20/22* | (2012.01) |
| *H04W 4/021* | (2018.01) |
| *G06Q 20/10* | (2012.01) |
| *G06Q 20/40* | (2012.01) |

(52) U.S. Cl.
CPC ....... *G06Q 20/3224* (2013.01); *G06Q 20/102* (2013.01); *G06Q 20/223* (2013.01); *G06Q 20/4015* (2020.05); *H04W 4/021* (2013.01); *H04W 4/08* (2013.01)

(58) Field of Classification Search
None
See application file for complete search history.

(56) References Cited

U.S. PATENT DOCUMENTS

| | | | |
|---|---|---|---|
| 2014/0351118 A1* | 11/2014 | Zhao | G06Q 20/326 705/40 |
| 2015/0142661 A1 | 5/2015 | Jain et al. | |
| 2018/0101881 A1* | 4/2018 | Tian | G06Q 40/00 |
| 2018/0232710 A1 | 8/2018 | Chiarella et al. | |
| 2019/0311339 A1 | 10/2019 | Nguyen | |

OTHER PUBLICATIONS

"Computing and Information," Newsbytes. May 11, 2017 (Year:2017).

* cited by examiner

*Primary Examiner* — Scott S Trotter
*Assistant Examiner* — Amit Patel
(74) *Attorney, Agent, or Firm* — Haynes and Boone, LLP

(57) ABSTRACT

There are provided systems and methods for time sensitive geo-location data for push notifications after shared transaction processing. A user may utilize a communication device to perform electronic transaction processing for a group of users at a location. The device may be geo-location enabled so that a service provider may detect a location of the device. Based on the geo-location of the user at the time of processing and other nearby geo-location enabled device, the service provider may determine other users that share in the transaction and are associated with the user using messaging connections and shared data transmissions. The service provider may determine the transaction that the user processed. The service provider may request that the other users provide the required reimbursement to the user that processed the transaction data. The other users' devices may receive a push notification and data to perform transaction processing.

20 Claims, 5 Drawing Sheets

TIME SENSITIVE GEO-LOCATION DATA FOR PUSH NOTIFICATIONS AFTER SHARED TRANSACTION PROCESSING

CROSS REFERENCE TO RELATED APPLICATIONS

This application is a continuation of U.S. application Ser. No. 15/855,437, filed Dec. 27, 2017, which is incorporated herein by reference in its entirety.

TECHNICAL FIELD

The present application generally relates to tracking geo-location data and device data connections, and more specifically to determining identifiers of participating devices in shared transaction processing through time sensitive geo-location data and device messaging.

BACKGROUND

Users may perform transactions together with other users, for example, when out dining with other users, all of the users may purchase items that are gathered into one transaction or bill for the group of users. One of the users may complete a single transaction or bill for all of the users. Often, the other users are required to engage in check splitting, which may be laborious and/or difficult based on the items each user purchased. Additionally, if the users ask for separate checks, these separate checks may cause a merchant to generate multiple bills and run multiple different payment instruments, which similarly may be time consuming and difficult for the merchant. Thus, multiple payment instruments provided to process a single transaction involving multiple payers may be undesirable for all parties involved in the transaction.

Figure 1:
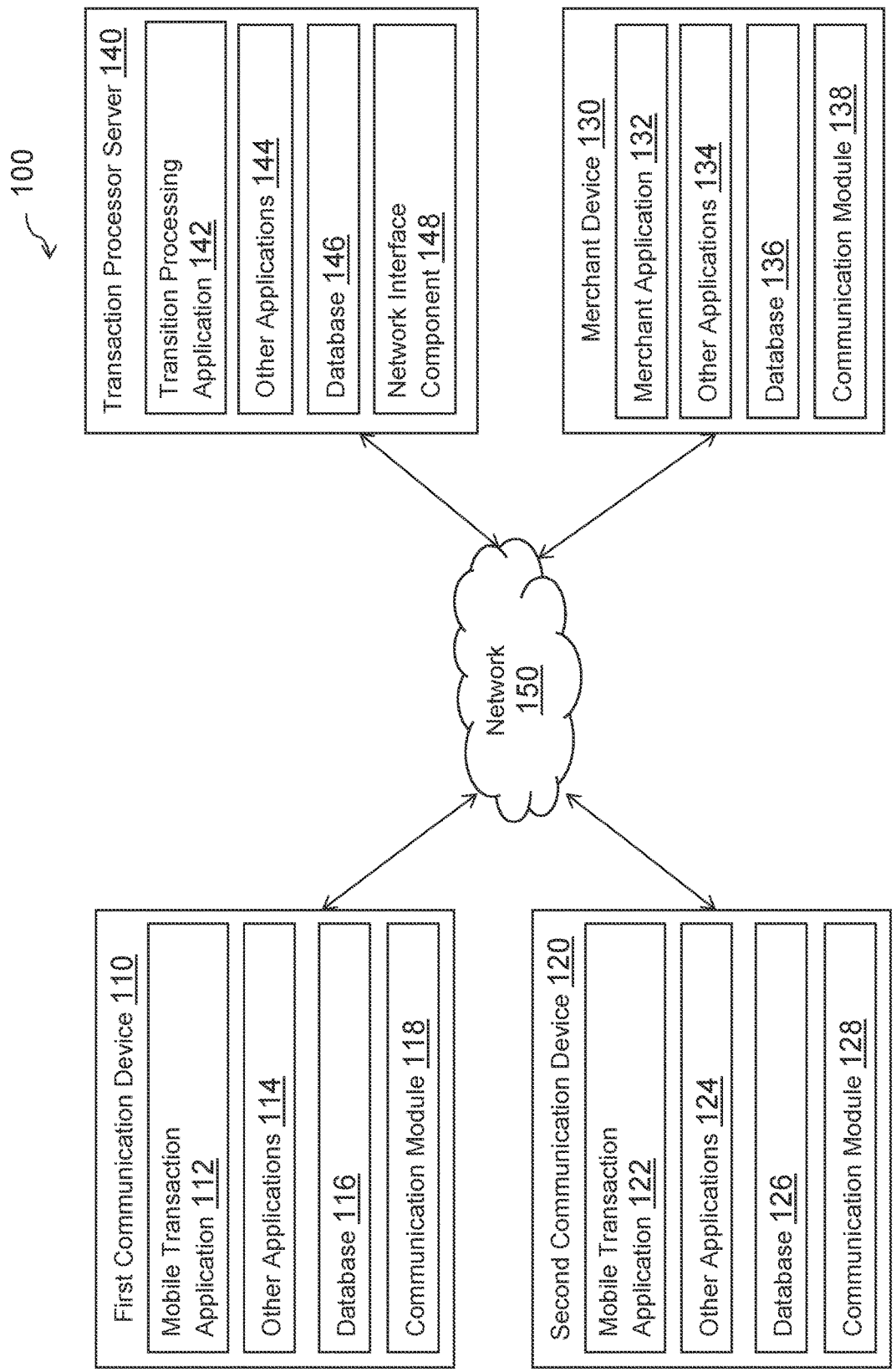
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for time sensitive geo-location data for push notifications after shared transaction processing. Systems suitable for practicing methods of the present disclosure are also provided.

A service provider, such as an entity utilising a transaction or payment processor, may provide a payment platform that enables a user to provide payments to a merchant as well as engage in user-to-user (or peer-to-peer (P2P)) payments and transfers through electronic transaction processing using the payment platform. In this regard, a computing device of the user may include a payment and/or transaction processing application, which may be configured to send and receive payments with other entities, such as another user and/or a merchant. The application may be associated with an electronic transaction service provider, such as PayPal® or other online payment service, which may provide payments and other services on behalf of users. The electronic transaction service provider may provide payment accounts and digital wallet services that enable the accounts to send, store, and receive money, process financial instruments, and/or provide transaction histories. The electronic transaction service provider may offer further services to users, such as extension of credit, credit history review, account establishment and maintenance, and other financial and personal services.

Merchants may similarly use service providers, including the transaction service provider, to receive payments from users. Merchants (e.g., a seller or payment receiver, such as a business, fundraiser, healthcare provider, landlord, etc.) may correspond to any person or entity selling goods and/or services (referred to herein as an "item" or "items") to other users/entities, such as buyers (e.g., a payer or payment sender, including a customer, donator, patient, renter, or other party). In one use case, the merchant may engage in transactions with multiple users (or payers) in one transaction, where the transaction process may further process payments for items purchased by multiple users in the single transaction. A first user may utilize an application to perform one or more processes and features for use of the financial services provided through the online transaction processor, including payment for a transaction with a merchant. The transaction may correspond to a split transaction or a shared transaction between multiple users, where the transaction includes multiple users participating in the transaction to purchase one or more items with the merchant. Each of the users in a single transaction with a merchant may be responsible for specific items that each of the users purchases in the transaction. For example, three friends or colleagues may go to lunch, where the three users order together and engage in a single split or shared transaction with the merchant providing lunch. In other embodiments, other groups of users may purchase together, including co-purchasers of larger transactions including investors or friends purchasing a shared item.

When processing the transaction to provide a payment to the merchant, for example, the first user may pay the entirety of the split transaction or group bill. The other users involved in the transaction may be required to provide reimbursement and/or other payments (e.g., interest) back to the user that provided payment in full for the transaction. In other embodiments, more than one of the users may process the transaction, where less than all of the users provide payment for the transaction (e.g., if other users split the transaction with the merchant but one or more of the users cover a specific user's purchase). In such embodiments, one or more of the users paying for the transaction may be owed by other users that have not contributed their respective portions to the transaction. It may be detected that the transaction is a shared transaction based on a cost, time, a number of items, a merchant location for the transaction, number of user devices at the transaction location, or other data for the transaction, the merchant location, or the first user, such as if the first user usually eats with friends on a Friday. In this regard, the service provider may determine the transaction is shared or split through one or more of a cost of the transaction, items in the transaction's receipt, a number of items on the receipt, a timestamp of the transaction, and/or a location of the transaction data. For example, a location of the split transaction (e.g., a location for the merchant in the split transaction and/or a geo-location provided when processing the split transaction) may be matched to a location of one or more other users.

In order to provide processing of the split transaction to provide a reimbursement to the first user paying for the transaction and/or push data to the other users' devices that allows for data population and processing of the reimbursement in a transaction processing application, the service provider (e.g., the transaction processor) may be required to determine the other users in the transaction. The transaction processor that processes the split transaction may utilize transaction data, geo-location enabled devices, and shared contacts or messaging information for the first user and other nearby users at or near the time of the transaction to determine the reimbursement transactions required by the other users sharing in the split transaction. The transaction data for the shared transaction may be generated by and stored with an account of the first user when the first user performs electronic transaction processing for the shared transaction, for example, after a successful transaction that provides a payment to the merchant. The transaction data may include a transaction time, location, merchant type or name, items in the transaction and/or cost, and other transaction information. The account of the user may also be used to store other data for the first user, including a detected geo-location of the first user's device at or around the time of the transaction (e.g., detected geo-location data over a period of time around the transaction) and social contact and/or messaging data for the user, including online or device based contacts of the user, messages sent and/or received by the user, or other contact, connections, and communication data.

The online service provider may provide account services to users of the online service provider, as well as other entities requesting additional services, which may be used to process electronic transactions and provide reimbursement transactions based on pushed transaction data. A user wishing to establish the account may first access the online service provider and request establishment of an account. The account may be established by providing account details, such as a login, password (or other authentication credential, such as a biometric fingerprint, retinal scan, etc.), and account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments. In order to create an account, the user may be required to select an account name and/or provide authentication credentials, such as a password, personal identification number (PIN), answers to security questions, and/or other authentication information. Once an account is created, the account may be accessed through a web browser from a website of the service provider and/or a dedicated application of the service provider, such as a mobile smart phone application. A token may be issued to the device of the user for their respective personal account, where the token may include data (which may be encrypted) allowing the service provider to identify the user and their account and authenticate the user. Additionally, the online service provider or other service provider may provide digital wallet services, which may offer financial services to send, store, and receive money, process financial instruments, and/or provide transaction histories. The application or website of the service provider, such as PayPal® or other online service provider, may provide payments and the other transaction processing services.

One such service is to process a group or shared transaction. First, users in the shared transaction may be determined, such as the service provider performing geo-location matching at a specific transaction time or within a time period or range around the transaction time. The transaction time may be detected through a time of purchase, time of application use in electronic transaction processing, or an entered time by the first user paying for the entire split or shared transaction. A transaction location may be determined through a location entered for the transaction, such as a merchant location (e.g., an address of the merchant, a name of the merchant, and/or other identifier for the merchant), or may be determined using a geo-location detection device (e.g., GPS coordinated determined through a GPS locator of a user's computing device).

A geo-fence may be established around the merchant location or the first user's geo-location, where the geo-fence defines a proximity range, radius, or distance around or nearby the first user where acceptable other users may be searched based on their geo-location that shared in the transaction. The geo-fence may be established based on an acceptable proximity range, such as normal distance around the user that friends/family would be located within when sharing the transaction (e.g., an average size of a dinner table at a restaurant), or may be established based on the size/geography of the merchant location or physical location around the user (e.g., ending before at a sidewalk/street where other users passing by are unlikely to be linked to the first user). The geo-fence may also be set by the first user so that the geo-fence encompasses nearby users associated with the first user. The geo-fence therefore corresponds to a range to perform geo-location detection by the service provider. Using the geo-fence, the geo-locations of other users that may have shared in the transaction may be determined. The geo-locations for the other users may be identified within the geo-fence at the transaction time, and may be determined/tracked within a time range before and/or after the transaction to determine time of arrival and/or departure of the first user and the other users at the location or within the geo-fence. Geo-location detection may be performed through a geo-location enabled device of the other users, such as a GPS or other location detection system of a user's mobile device. Geo-location detection may also be performed through other transaction processing data and/or check-in data. Thus, the service provider may perform initial detection of other users potentially sharing in the transaction through geo-location detection within the geo-fenced area.

Using the geo-locations within the geo-fence, the other users may be identified. However, geo-locations or users that did not share in the transaction may sometimes be caught within the geo-fence, For example, a nearby table of different users not sharing in the transaction may sometimes overlap the geo-fenced area or other users may travel within the geo-fenced area, including passer-by users, service employees, etc. Thus, to provide a finer degree of detection and perform matching of users sharing in the transaction with the first user paying for the shared transaction, the service provider may utilize social and messaging contacts to determine whether the users within the geo-fence perform data exchanges or have network links to the first user.

Social contacts used by the service provider may include online social networking services, where a user may check-in with the merchant and/or identify the merchant within online posted data provided to the online service. Known contacts of the user (e.g., social networking friends, address book contacts, stored images, etc.) may be processed to determine if the first user and each of the other users within the geo-fence at or around the transaction time have any known connections, and further to determine the identity of the other users. The connections may correspond to direct connections or links between the users, such as friends on a social networking platform or stored contacts in a messaging or contact list application. The connections may also correspond to a second degree or further shared connection, such as a friend of a friend, where the users share a contact between the two users but may not necessarily be directly connected. The shared contact may also be one of the users within the geo-fenced area at the time of the transaction. Thus, a social graph of the first user with other users within the geo-fenced area may be determined to determine whether the users are linked and potentially shared in the transaction.

Users may utilize online platforms, resources, and/or services to share information with other users. For example, a social networking platform (e.g., FACEBOOK®) may provide a user with an account where the user may share media and post text and/or digital content (e.g., images, videos, emojis or other visual icons, etc.), which may include friends lists of contacts as well as posts and messages between users. In other embodiments, the users may utilize different types of online services to share information and/or perform messaging, including media sharing services (e.g., for sharing of images and/or videos, such as YOUTUBE®, INSTAGRAM®, or IMGUR®), a microblogging service (e.g., for sharing of small text blog posts and/or images/videos, such as TWITTER®), or other online service. The users may therefore post data or transmit messages using the online services, where the data may correspond to text, image, video, and/or other data (e.g., visual icons, such as emojis, animated images, etc.). The posted data may include information that the user wishes to convey to other users and/or wishes to store to the online service. For example, the posted data may inform other users of where the user is and/or what the user is currently doing. Additionally, the posted data may include a timestamp, location of the posted data, and/or other metadata associated with the user and/or user's account, generation of the posted data, and/or posting of the posted data to the online service.

Messages between users may also be exchanged on other platforms, including data exchanges through a messaging, email, or online social networking/microblogging platform may also be used to determine whether users are known and associated with each other. The messages may correspond to direct messages, tags, or data sharing between users. The messages may also correspond to messages with a shared contact, such as a known user, which may also be one of the users within the geo-fenced area. Thus, a messaging chain or shared messaging links and data shares may be used to determine whether the first user is associated with any of the other users detected within the geo-fenced area. Additionally, the user may provide one or more "tags" within the online posted data that is provided to an online service and/or shared through the online service. For example, a tag may correspond to a selection in the posted data, an identifier for the user and/or another user in the posted data, a group identifier for a group of users, a word or statement preceded by a hashtag or other symbol denoting a topic or group, and/or other data that may be user to identify other users and/or groups of users (referred to herein as a "tag" or "tags"). Thus, the tags may be used to identify other users that are associated with the user and correspond to online posted data of the user. For example, a tag in a text data post to an online resource may include an identifier of the user, such as a name, account identifier (e.g., username for the account), device identifier, or other identifier used to determine an identity of the user or otherwise determine the user. If the users share a social network connection, contact, have exchanged messages, or have sent/received other data, then it is likely that the user within the geo-fenced area at the time of the transaction is known to the first user and shared in the transaction (e.g., due to the transaction cost and/or items in the transaction). However, if there is no social connection between the first user and a user detected within the geo-fenced area, then it is unlikely the user shared in the transaction as the user are "unknown" to each other and therefore are unlikely to have purchased items together.

Additionally, the service provider may utilize a time of arrival and/or departure from the merchant location to determine whether the users within the geo-fenced area at the transaction time or around the transaction time shared in the transaction with the first user. For example, geo-location data for the first user may be tracked over a period of time to determine when the first user arrived at the location as well as when the user left the location. The geo-location data may be tracked for a period of time to compensate for movement of the first user, such as if the first user leaves the geo-fence while shopping or eating (e.g., to use a restroom) but quickly returns to the geo-fenced area to complete the transaction or event corresponding to the shared transaction. Other users within the geo-fenced area at the time of the transaction may also have their geo-location data tracked for a period of time around the transaction time. The service provider may then determine whether any of the users travelled together, such as the first user with one or more of the other users within the transaction area, such as if they arrived within the geo-fence and/or at the merchant location at a same time or within a same time frame (e.g., within 5-15 minutes where the users may be meeting for dinner) or if they departed or are departing within a same time frame. Thus, matching may be performed further based on co-location of geo-locations over a period of time and similar travel by users over the time period.

Users may also be detected, added, and/or removed from potential users sharing in the transaction and requiring a repayment to the first user paying for the shared transaction based on circumstances and additional information mined for the user, which may further use intelligent decision-making by the service provider. For example, a user arriving late to a dinner or other transaction may still be detected (although the user doesn't share an arrival time) through sharing social contacts, messages before and/or at the location/within the geo-fence, and/or shared departure time. However, if the user does share social contacts but may not share an arrival and departure time, such as a user that may happen to run into the group of users at the transaction location and passes within the geo-fence for a short time, it may be determined that the user did not share in the transaction, especially if the user's geo-location detect at the time of the shared transaction is not within the geo-fence (e.g., if the user only visited for a short time during a meal. Thus, time within the geo-fence may also be a factor to determining users sharing in the transaction. Other circumstances may also be used to identify and add or remove users from those potentially requiring a reimbursement push notification to be sent to the user's device. A user that has a birthday or is sharing a special occasion (e.g., an anniversary, engagement, new job, retirement, etc.) may not receive a push notification, as it may be determined that the other users are paying for that user's share of the transaction. The data for the special circumstance may be determined through mining social networking posts, calendar data, messages, or other available data.

Matching may be given a degree of variance or difference, for example, where the locations match within a certain distance and/or the timestamps are within a set time difference. Moreover, where it is determined that the cost and/or items in the transaction indicate multiple users (e.g., high cost for one user, which may be compared to an average for the user and/or the merchant, multiple items purchased where each item may correspond to a separate user, such as multiple dinners, or other item/cost information), the service provider may request transaction information, such as the location and/or timestamp of the transaction, with the geo-location data for the geo-fenced area from one or more online services. The service provider may also determine that the transaction is a split transaction by receive a first transfer or reimbursement transaction processing request from a second user within the geo-fenced area at the transaction time to the first user. The transfer or payment from the second user may be for less than the transaction amount paid by the first user, and may occur within the merchant location/geo-fenced area at or around the time of the transaction. This data may signify that the transfer or payment is a reimbursement for part of the transaction paid by the first user. The service provider may utilize this data to begin searching for other matching users within the geo-fenced area at the time of the transaction, for example, connections of the first and/or second user that are within the geo-fenced area during the time period around the transaction time and/or may have arrived together or are departing the geo-fenced area together.

Additionally, the other users attempting to reimburse the first user may also be identified based on the other users opening the same or similar transaction processing or payment application (e.g., Venmo™ or PayPal™ application) at the same time or a similar time as the first user (who may be requesting the reimbursement) or the second user (who perform the reimbursement transaction). Thus, the service provider may utilize the users opening the same (or similar instances/respective iterations) of the application on their device and/or navigating to the same or similar interface (e.g., a transaction processing interface), which indicates the user is attempting a reimbursement transaction request. The service provider may monitor or check processing and application usage on the devices of the other users that may potentially be sharing in the shared transaction to determine whether application usage and/or input indicates that one or more of the other users are attempting to provide a reimbursement to the first user or while in the geo-fenced area at or around the transaction time. Since the geo-fence area limits the number of other potential users in the shared transaction, specific application usage at or around the transaction time may be used to determine, with a high degree of confidence, that the other user is attempting a repayment to the first user.

In response to the second user providing the transfer of an amount to the first user while the first and second user are within the geo-fenced area and/or within a similar time period at or around the transaction, a similar reimbursement or transaction processing request may be pushed to the other users that match with the first user and/or the second user, for example, by having shared contacts/geo-location data. The pushed notification to the other devices may be for a same or similar amount as the processed transfer/payment from the second user, and may include an identifier for the first user or the first user's account/device to allow for transaction processing. The pushed data for the reimbursement may be for an even split of the transaction amount, and may provide an interface element, such as a slide or data entry field, to allow for adjustment of the reimbursement amount. The pushed data may therefore correspond to application and/or application interface/process data, which may be automatically populated within the application. The pushed data may also correspond to a message regarding the repayment and the processed shared transaction, and may include an executable process to open the application and automatically load the reimbursement transaction data (e.g., an identifier for the first user and other data necessary for the reimbursement transaction) to the application and output the data in an interface of the application.

Once the service provider determines that the user processed a share transaction, the service provider may determine that the other users in the transaction are required to provide reimbursement to the user for their respective portions in a reimbursement transaction. Once a portion owed to the user by the other users for reimbursement of payment made for the split transaction is determined, the service provider may push a notification or other data to each device of the other users sharing in the transaction and/or may process one or more reimbursement transactions to the user by the other users. The service provider may automatically process a reimbursement transaction by one of the other users to the user, for example, if the other user opts in to a service to provide automated payments. The payment may be made from a payment account of the other user to the user, where the payment account for the other user and the user may be provided and serviced by the service provider. In other embodiments, the service provider may require approval from the other user, for example, by transmitting a request to approve and process the reimbursement transaction to the other user and processing the reimbursement transaction on receipt of the approval. The other users may be required to provide verification that the other users are part of the split transaction prior to transaction processing, and may utilize the data in the user interface to confirm electronic transaction processing, decline processing, and/or adjust an amount or transaction recipient (and may provide other input including a message).

In this manner, users may be automatically linked and data pushed to their devices without requiring user input. Interfaces on the devices may enable automatic data input and entry, and may simplify data retrieval and processing. Service providers may provide intelligent linking of devices and automatic population of data through push notifications by determining shared connections and geo-locations. Moreover, electronic transaction processing operations may be simplified to allow for easier data processing without requiring multiple user inputs.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first communication device 110, a second communication device 120, a merchant device 130, and a transaction processor server 140 in communication over a network 150. A first user (not shown) may utilize first communication device 110 to utilize the various features available for first communication device 110, which may include processes and/or applications that may be used to process a shared transaction with merchant device 130, where the transaction is shared with a second user (not shown) associated with second communication device 120. For example, the first user may provide a payment to a merchant associated with merchant device 130 for a transaction between the first user, the second user, and the merchant, where both the first and second users purchase items in the transaction. The transaction may be processed using transaction processor server 140. First communication device 110 may provide geo-location data at and around the transaction time to transaction processor server 140, which may be matched to geo-location data for second communication device 120 by transaction processor server 140. Transaction processor server 140 may then use additional data and matching processed to determine the second user shared in the transaction and push reimbursement transaction processing data to second communication device 120.

First communication device 110, second communication device 120, merchant device 130, and transaction processor server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

First communication device 110 may be implemented as a communication device that may utilize appropriate hardware and software configured for wired and/or wireless communication with second communication device 120, merchant device 130, and/or transaction processor server 140. For example, in one embodiment, first communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

First communication device 110 of FIG. 1 contains a mobile transaction application 112, other applications 114, a database 116, and a communication module 118. Mobile transaction application 112 and other applications 114 may correspond to executable processes, procedures, and/or applications with associated hardware. In other embodiments, first communication device 110 may include additional or different modules having specialized hardware and/or software as required.

Mobile transaction application 112 may correspond to one or more processes to execute modules and associated devices of first communication device 110 to process a shared or split transaction by the user (first user) associated with first communication device 110 with a merchant, where the shared transaction includes other users that are also transaction participants (e.g., the other users also have purchased items in the split transaction and are responsible for part of the cost of the split transaction), such as another user (second user) associated with second communication device 120. Mobile transaction application 112 may be utilized by the user of first communication device 110 to provide an interface to permit the user associated with first communication device 110 to select payment options and provide payment for items, for example, to a merchant through merchant device 130 using transaction processor server 140. Mobile transaction application 112 may be implemented with a user interface enabling the user to enter payment options, select and provide payment options on checkout/payment of one or more items with a merchant, and complete a split transaction for the item(s) through processing a payment request for the item(s) with transaction processor server 140. Mobile transaction application 112 may also be used to establish a user account, such as a payment account, with transaction processor server 140 to provide payments through the payment account. Mobile transaction application 112 may be used to enter transaction data, including an amount, location, and/or merchant identifier. Moreover, mobile transaction application 112 may be used to opt-in to automatic credit, debit, and/or transaction processing of reimbursement payments to users in shared transactions. Thus, mobile transaction application 112 may be used to receive a repayment from another user in the shared transactions, for example, a payment from second communication device 120 and/or receive transaction processing results from a payment to the user's account used by mobile transaction application 112.

In this regard, mobile transaction application 112 may initiate, engage in, and/or receive a share transaction, where the transaction includes one or more items for purchase by the user associated with first communication device 110 and the other user associated with second communication device 120 from the merchant associated with merchant device 130. Mobile transaction application 112 may be used to process the transaction with transaction processor server 140 to provide a payment to merchant device 130 for the entirety of the transaction. The payment request may be processed using a payment account for the user. For example and as discussed herein, transaction processor server 140 may be used to provide payment to the merchant associated with merchant device 130. Mobile transaction application 112 may therefore be used to provide payment information for use in processing the payment. Mobile transaction application 112 may utilize user financial information, such as a credit card, bank account, or other financial account, as a payment instrument when providing payment information for use in the shared transaction. Additionally, mobile transaction application 112 may utilize a user account with payment provider, such as transaction processor server 140, as the payment instrument. Mobile transaction application 112 may be utilized to view the results of the transaction and/or for viewing and storage of a transaction history, such as a receipt, which may include a merchant location, a geo-location, and/or a timestamp of the transaction. In various embodiments, mobile transaction application 112 may correspond to a general browser application configured to retrieve, present, and communicate information over the Internet (e.g., utilize resources on the Internet) or a private network. In other embodiments, mobile transaction application 112 may include a dedicated application of transaction processor server 140, which may be configured to purchase items through input provided to mobile transaction application 112. Another user, such as the user associated with second communication device 120, may be required to provide reimbursement to the user of first communication device 110 for their respective portion of the transaction, which may be determined and processed by transaction processor server 140 as discussed herein.

In various embodiments, first communication device 110 includes other applications 114 as may be desired in particular embodiments to provide features to first communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. Other applications 114 may include social networking applications, media viewing, and/or microblogging applications. Other applications 114 may therefore correspond to a message platform, a contact list, a social network, a microblogging service, a media sharing service, or other online resource used to exchange information with other users and services, which may be used to determine contacts of the first user associated with first communication device 110, which may include a phone number, a name, an online identifier, an online username, device identifier, network identifier, or other type of identifier for the other users.

In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for first communication device 110 and processes the location information to determine a location of first communication device 110 and the user. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of first communication device 110, such as display devices capable of displaying information to users and other output devices.

First communication device 110 may further include database 116 stored to a transitory and/or non-transitory memory of first communication device 110, which may store various applications and data and be utilized during execution of various modules of first communication device 110. Thus, database 116 may include, for example, identifiers such as operating system registry entries, cookies associated with mobile transaction application 112 and/or other applications 114, identifiers associated with hardware of first communication device 110, or other appropriate identifiers, such as identifiers used for payment/user/device authentication or identification, which may be communicated as identifying first communication device 110 to transaction processor server 140. Database 116 may include transaction information for one or more split transactions, as well as geo-location data and/or contact/messaging data.

First communication device 110 includes at least one communication module 118 adapted to communicate with second communication device 120, merchant device 130, and/or transaction processor server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Second communication device 120 may be implemented as a communication device that may utilize appropriate hardware and software configured for wired and/or wireless communication with first communication device 110, merchant device 130, and/or transaction processor server 140. For example, in one embodiment, second communication device 120 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Second communication device 120 of FIG. 1 contains a mobile transaction application 122, other applications 124, a database 126, and a communication module 128. Mobile transaction application 122 and other applications 124 may correspond to executable processes, procedures, and/or applications with associated hardware. In other embodiments, second communication device 120 may include additional or different modules having specialized hardware and/or software as required.

Mobile transaction application 122 may correspond to one or more processes to execute modules and associated devices of second communication device 120 to receive data for a repayment or reimbursement request for a portion of a shared transaction paid for using first communication device 110 and process the data to provide a payment to the account of the user associated with first communication device 110, where the data may correspond a notification and transaction information for the reimbursement pushed to second communication device 120 by transaction processor server 140. Mobile transaction application 122 may be utilized by the user of second communication device 120 to provide an interface to permit the user associated with second communication device 120 to select payment options and provide payment for items, for example, for a reimbursement or repayment to first communication device 110 using transaction processor server 140. Mobile transaction application 122 may be implemented with a user interface enabling the user to enter payment options, select and provide payment options on requesting the transfer or repayment, and complete a repayment or transfer transaction for the shared transaction using transaction processor server 140. Mobile transaction application 122 may also be used to establish a user account, such as a payment account, with transaction processor server 140 to provide payments through the payment account. Mobile transaction application 122 may be used to enter transaction data, including an amount and/or user identifier for the transfer/repayment. Moreover, mobile transaction application 122 may be used to opt-in to automatic credit, debit, and/or transaction processing of reimbursement payments to users in shared transactions. Thus, mobile transaction application 122 may be used to receive transaction processing results from a payment to the user's account used by mobile transaction application 122.

In this regard, mobile transaction application 122 may receive pushed notification data for a repayment or transfer for a portion of a shared transaction, where the data allows for repayment to the first user associated with first communication device 110 from the second user associated with second communication device 120. The data may include an identifier and an amount, which may be automatically populated into a form, process, and/or interface of mobile transaction application 122. Mobile transaction application 122 may be used to process the transaction with transaction processor server 140 to provide a payment to first communication device 110 for the portion of the shared transaction required by the second user. The payment request may be processed using a payment account for the second user to an account of the first user. Mobile transaction application 122 may therefore be used to provide payment information for use in processing the payment. Mobile transaction application 122 may utilize user financial information, such as a credit card, bank account, or other financial account, as a payment instrument. Additionally, mobile transaction application 122 may utilize a user account with payment provider, such as transaction processor server 140, as the payment instrument. Mobile transaction application 122 may be utilized to view the results of the transaction and/or for viewing and storage of a transaction history, such as a receipt, which may include a repayment or transfer information to first communication device 110 and/or information for the shared transaction (e.g., merchant location, a geo-location, and/or a timestamp of the transaction). In various embodiments, mobile transaction application 122 may correspond to a general browser application configured to retrieve, present, and communicate information over the Internet (e.g., utilize resources on the Internet) or a private network. In other embodiments, mobile transaction application 122 may include a dedicated application of transaction processor server 140, which may be configured to purchase items through input provided to mobile transaction application 122.

In various embodiments, second communication device 120 includes other applications 124 as may be desired in particular embodiments to provide features to second communication device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. Other applications 124 may include social networking applications, media viewing, and/or microblogging applications. Other applications 124 may therefore correspond to a message platform, a contact list, a social network, a microblogging service, a media sharing service, or other online resource used to exchange information with other users and services, which may be used to determine contacts of the second user associated with second communication device 120, which may include a phone number, a name, an online identifier, an online username, device identifier, network identifier, or other type of identifier for the other users.

In various embodiments, other applications 124 may include financial applications, such as banking applications. Other applications 124 may also include other location detection applications, which may be used to determine a location for the user, such as a mapping, compass, and/or GPS application, which can include a specialized GPS receiver that obtains location information for second communication device 120 and processes the location information to determine a location of second communication device 120 and the user. Other applications 124 may include device interfaces and other display modules that may receive input from the user and/or output information to the user. For example, other applications 124 may contain software programs, executable by a processor, including a graphical user interface (GUI) configured to provide an interface to the user. Other applications 124 may therefore use devices of second communication device 120, such as display devices capable of displaying information to users and other output devices.

Second communication device 120 may further include database 126 stored to a transitory and/or non-transitory memory of second communication device 120, which may store various applications and data and be utilized during execution of various modules of second communication device 120. Thus, database 126 may include, for example, identifiers such as operating system registry entries, cookies associated with mobile transaction application 122 and/or other applications 124, identifiers associated with hardware of second communication device 120, or other appropriate identifiers, such as identifiers used for payment/user/device authentication or identification, which may be communicated as identifying second communication device 120 to transaction processor server 140. Database 126 may include transaction information for one or more split transactions, as well as geo-location data and/or contact/messaging data.

Second communication device 120 includes at least one communication module 128 adapted to communicate with second communication device 120, merchant device 130, and/or transaction processor server 140. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices using short range communications, such as Bluetooth Low Energy, LTE Direct, WiFi, radio frequency, infrared, Bluetooth, and near field communications.

Merchant device 130 may be maintained, for example, by a merchant that provides sales to users through first communication device 110 and/or transaction processor server 140, which may include sale of items for more than one user in a shared transaction between the users. In this regard, merchant device 130 may correspond to a device having processing applications, which may be configured to interact with first communication device 110 to engage in a shared transaction. Merchant device 130 may further interface with transaction processor server 140 for transaction processing of the transactions. Merchant device 130 may be implemented using any appropriate hardware and software configured for wired and/or wireless communication with first communication device 110 and/or communication device 130. For example, in one embodiment, merchant device 130 may be implemented as a single or networked personal computer (PC), a smart phone, laptop computer, wearable computing device, and/or other types of computing devices at a merchant location capable of transmitting and/or receiving data. Although only one merchant device is shown, a plurality of merchant devices may function similarly.

Merchant device 130 of FIG. 1 contains a merchant application 132, other applications 134, a database 136, and a communication module 138. Merchant application 132 and other applications 134 may correspond to processes, procedures, and/or applications executable by a hardware processor, for example, a software program. In other embodiments, merchant device 130 may include additional or different modules having specialized hardware and/or software as required.

Merchant application 132 may correspond to one or more processes to execute modules and associated specialized hardware of merchant device 130 that provide sales, checkout, and payment processes for a transaction to purchase one or more items for sale from a user, such as a merchant or seller, corresponding to merchant device 130. In this regard, merchant application 132 may correspond to specialized hardware and/or software of merchant device 130 to provide a convenient interface to permit a seller to enter, view, and/or edit items and/or services for purchase by the buyer associated with first communication device 110, which may include a transaction for multiple users that is paid for in a single electronic transaction processing event by first communication device 110. For example, merchant application 132 may be implemented as an application having a user interface enabling the seller to enter item information and request payment for a transaction on checkout/payment of one or more items/services. In certain embodiments, merchant application 132 may correspond more generally to a web browser configured to provide information over the Internet, for example, by hosting a website or online marketplace corresponding to the merchant and/or communicating information to another online marketplace utilized by the merchant or seller. Thus, merchant application 132 may provide item sales through an online marketplace using the website of the merchant or another service provider. The user associated with first communication device 110 may initiate a shared transaction using merchant application 132, where transaction processing may occur through communications between first communication device 110 and merchant device 130. Thus, item sales and/or transaction information may be communicated to first communication device 110, where the user associated with first communication device 110 may view and interact with the information, for example, to approve or decline transaction processing. In other embodiments, the first user may provide data to merchant application 132 for the payment, such as a token for a payment account or a payment instrument.

Once a payment amount is determined for a shared transaction for items to be purchased by users, such as the user associated with first communication device 110 and the other user associated with second communication device 120, merchant application 132 may request payment from the user associated with first communication device 110 for transaction processing. Payment may be provided through a payment instrument. Merchant application 132 may provide additional sales incentives and available payment processes, such as a payment plan, extendable credit, or other incentive (e.g., rebates, discounts, etc.). Payment information may be communicated to merchant device 130 by first communication device 110, which may be used with the transaction and transaction information for approval. Merchant application 132 may then receive the results of the transaction processing, and complete the transaction with the user, for example, by providing the user and the other the items for the split transaction or declining the split transaction where the user is not authenticated or the split transaction is not authorized (e.g., insufficient funds, rejection of the transaction based on risk analysis, etc.). Merchant application 132 may receive a payment notification from transaction processor server 140, including the payment value. A transaction history or receipt may then be generated by merchant application 132 and provided to one or more of first communication device 110 and/or transaction processor server 140. The transaction history may further include additional information for use in determining whether the transaction is a shared transaction and the users in the transaction, such as items purchased by each user in the split transaction, a transaction location, or other transaction data.

Merchant device 130 includes other applications 134 as may be desired in particular embodiments to provide features to merchant device 130. For example, other applications 134 may include security applications for implementing client-side security features, programmatic client applications for interfacing with appropriate application programming interfaces (APIs) over network 150, or other types of applications. Other applications 134 may also include email, texting, voice and IM applications that allow a user to send and receive emails, calls, texts, and other notifications through network 150. In various embodiments, other applications 134 may include financial applications, such as banking, online payments, money transfer, or other applications associated with communication device 130. Other applications 134 may contain software programs, executable by a processor, including a graphical user interface (GUI) configured to provide an interface to the user.

Merchant device 130 may further include database 136 which may include, for example, identifiers such as operating system registry entries, cookies associated with merchant application 132 and/or other applications 134, identifiers associated with hardware of merchant device 130, or other appropriate identifiers, such as identifiers used for payment/user/device authentication or identification. Identifiers in database 136 may be used by a payment/credit provider to associate merchant device 130 with a particular account maintained by the payment/credit provider. Database 136 may further include transaction information and/or results, including received payment information.

Merchant device 130 includes at least one communication module 138 adapted to communicate with first communication device 110 and/or transaction processor server 140. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor server 140 may be maintained, for example, by an online service provider, which may provide split transaction determination and processing services, as well as additional transaction and payment services, to one or more users. In this regard, transaction processor server 140 includes one or more processing applications which may be configured to interact with first communication device 110, merchant device 130, and/or another device/server to facilitate connecting users having a shared interest. In one example, transaction processor server 140 may be provided by PAYPAL®, Inc. of San Jose, Calif., USA. However, in other embodiments, transaction processor server 140 may be maintained by or include another type of service provider, which may provide the aforementioned services to a plurality of users.

Transaction processor server 140 of FIG. 1 includes a transaction processing application 142, other applications 144, a database 146, and a network interface component 148. Transaction processing application 142 and other applications 144 may correspond to executable processes, procedures, and/or applications with associated hardware. In other embodiments, transaction processor server 140 may include additional or different modules having specialized hardware and/or software as required.

Transaction processing application 142 may correspond to one or more processes to execute software modules and associated specialized hardware of transaction processor server 140 to receive a shared transaction processed by a user associated with first communication device 110, where the user requires reimbursement from the other users in the shared transaction, and determine the other users in the split transaction using the transaction data, as well as process transactions between users. In this regard, transaction processing application 142 may correspond to specialized hardware and/or software to receive information for a shared transaction processed by a user, as well as geo-location data, application usage data, and/or messaging/contact data for the first user (e.g., data for contacts and shared messages using a social networking platform, media sharing service, microblogging service, messaging platform, etc.). For example, transaction processing application 142 may receive, from first communication device 110 and/or merchant device 130, data for a processed shared transaction having the user associated with first communication device 110 and other additional users, such as the user associated with second communication device 120, as transaction participants in purchasing items from the merchant associated with merchant device 130. The data for the shared transaction may include transaction information, such as a cost of the split transaction, items in the transaction, tax, tip, and/or other transaction information. In various embodiments, the user and/or the merchant may include user information for the user and/or the other users that allows identification of the user and/or the other users. However, in other embodiments, transaction processing application 142 may determine the transaction is a shared transaction based on the transaction cost, location, items, time, nearby geo-located user devices, or other data. In such embodiments, transaction processing application 142 may then utilize one or more processes to determine the users in the shared transaction based on the users geo-locations within a geo-fence, shared messages or contacts, and/or application usage of an application, such as mobile transaction applications 112 and 122.

Transaction processing application 142 may determine geo-locations for users, and may perform matching if the geo-locations are within the same geo-fence at or around the transaction time. Transaction processing application 142 may therefore determine a transaction location and/or detect a geo-location of first communication device 110 at and/or around the transaction time, for example, using a GP S or other geo-location detection system of first communication device 110. Transaction processing application 142 may establish a geo-fence at and around the transaction location or the detected geo-location for first communication device 110. The geo-fence may correspond to a proximity range, radius, or distance from the transaction location or geo-location to search for and detect other geo-locations. Transaction processing application 142 may search for other geo-location enabled devices within the geo-fence at or within a time range of the transaction time. Thus, transaction processing application 142 may detect second communication device 120 as being within the geo-fence in a time period around the transaction time. Transaction processing application 142 may also track the geo-locations of first communication device 110 and second communication device 120 over time to determine of the geo-location data matches or is correlated over a time period, such as arriving at the same or similar time within the merchant location or geo-location and leaving at a same or similar time.

Transaction processing application 142 may utilize the geo-location data to determine all of the transaction participants in the shared transaction with messaging and/or social contact information. Messaging information, such as text, image, or video messages sent through a messaging application, platform, or other resource, may be processed to determine if there is any connection between the user associated with first communication device 110 that processed the shared transaction, and any other users detected within the geo-fence, such as the user associated with second communication device 120. The messaging information may include a name, account identifier (e.g., for a payment account and/or account with the online resource), contact information (e.g., email, phone number, etc.), or other information necessary to determine an identity of each of the other users. Transaction processing application 142 may further use application usage for the devices detected within the geo-fence, such as second communication device 120. For example, second communication device 120 may open an application, such as mobile transaction application 122 at or about the same time as the processed shared transaction, or while second communication device 120 is within the geo-fenced area within the time period around the transaction time. Transaction processing application 142 may receive application data, including a processed transaction by another user in the geo-fence to the user for first communication device 110 to determine that the transaction was shared between users. Thus, a transfer or payment from another user while inside the geo-fence at the transaction time with first communication device 110 may indicate that other users are attempting a repaying, and the user for second communication device 120 should receive pushed data to process a repayment transaction.

The aforementioned location matching may be used by transaction processing application 142 to verify that each of the other users were transaction participants in the transaction, or the users may confirm through additional input verifying the transaction by the user and/or the other users. The identifier for second communication device 120 determined through geo-location from the geo-location enabled device and/or through messaging, social contacts, and/or application usage may also be used to process a payment to the user from the other users, such as a payment in a reimbursement transaction for the other users' respective shares of the split transaction. Transaction processing application 142 may generate output data that includes an identifier for first communication device 110 and/or the account for transaction processing application 142. The data may be pushed to second communication device 120, and may automatically populate a form, interface, or process with data necessary to process the repayment, which may include an even and/or adjustable split of the processed transaction. Transaction processing application 142 may then be used to process a repayment transaction.

Thus, transaction processing application 142 may provide transaction processing services to users, for example though a payment account and/or payment instruments, which may include payment during transaction processing of a split transaction and/or reimbursement transaction. In this regard, transaction processing application 142 may provide payment services and payment accounts, including digital wallets storing payment instruments. The transaction processing services may allow for a payment by a user associated with first communication device 110 to a merchant for a shared transaction through a payment instrument, including a credit/debit card, banking account, payment account with transaction processor server 140, and/or other financial instrument. The transaction may include other users sharing in the transaction. The transaction processing services may further include services to process reimbursement transactions determined by transaction processing application 142, where the reimbursement transactions provide a payment to the user by another user associated with second communication device 120 for a portion owed by the other user to the user.

In order to establish a payment account for a user to send and receive payments, transaction processing application 142 may receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account. Transaction processing application 142 may further allow the user to service and maintain the payment account, for example, by adding and removing payment instruments. Transaction processing application 142 may be used to process a transaction between a user paying for the transaction and a merchant, as well as payments and transfers between users. In order to perform transaction processing of the transaction and/or payments, transaction processing application 142 may debit an account of the user and provide the payment to an account of the merchant or other. After processing a shared transaction, transaction processing application 142 may further be used to process reimbursement transactions between the other users shared the transaction and the user. Thus, when processing the reimbursement transactions, transaction processing application 142 may debit accounts of the other users and provide reimbursement payments to the account of the user. In various embodiments, the reimbursement transactions may be processed without input by the other users, for example, if the other users opt in to automatic debits for split transactions. However, in other embodiments, transaction processing application 142 may require approval by the other users for transaction processing. Transaction processing application 142 may also be used to provide transaction histories for processed transactions.

In various embodiments, transaction processor server 140 includes other applications 144 as may be desired in particular embodiments to provide features to transaction processor server 140. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing transaction processor server 140, where the user or other users may interact with the GUI to more easily view and communicate information. In various embodiments, other applications 144 may include connection and/or communication applications, which may be utilized to communicate information to over network 150.

Additionally, transaction processor server 140 includes database 146. As previously discussed, a user may establish one or more digital wallets and/or payment accounts with transaction processor server 140. Digital wallets and/or payment accounts in database 146 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to transaction processor server 140, e.g., from first communication device 110, one or more digital wallets and/or payment accounts belonging to the users may be found. Database 146 may also store received transaction information for split transactions and/or reimbursement transactions, as well as contact and/or application data.

In various embodiments, transaction processor server 140 includes at least one network interface component 148 adapted to communicate first communication device 110, second communication device 120, and/or merchant device 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2C:
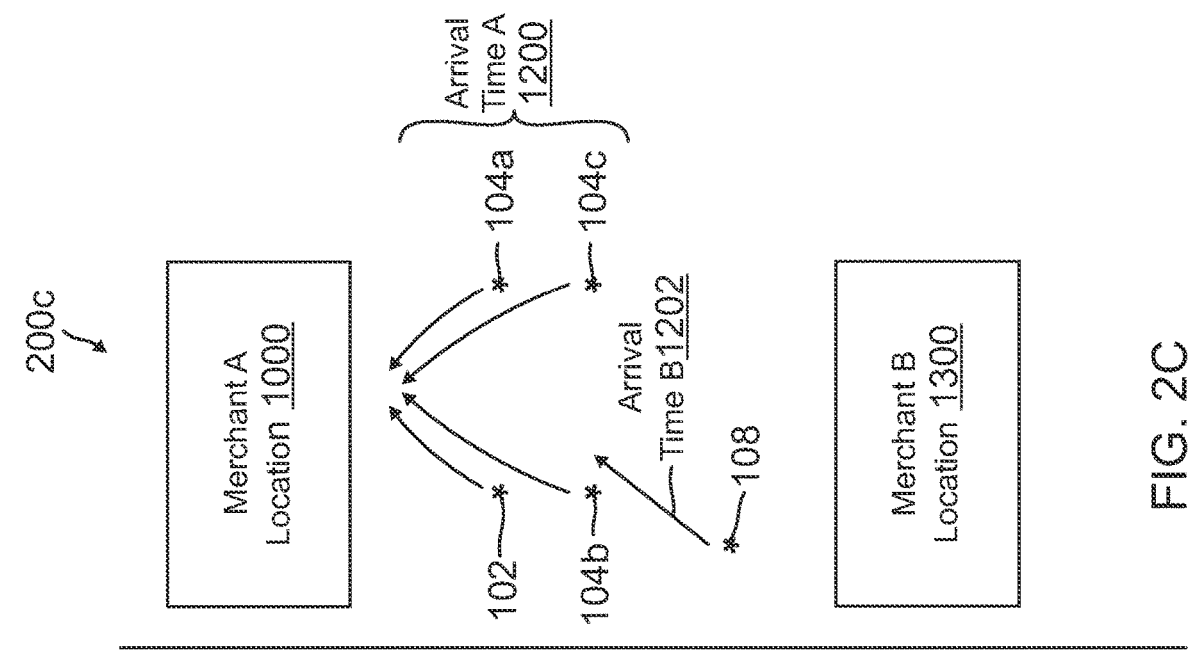
FIG. 2C is an exemplary system environment using shared geo-location tracking data and movement to identify users participating in a shared transaction, according to an embodiment.
Figure 2B:
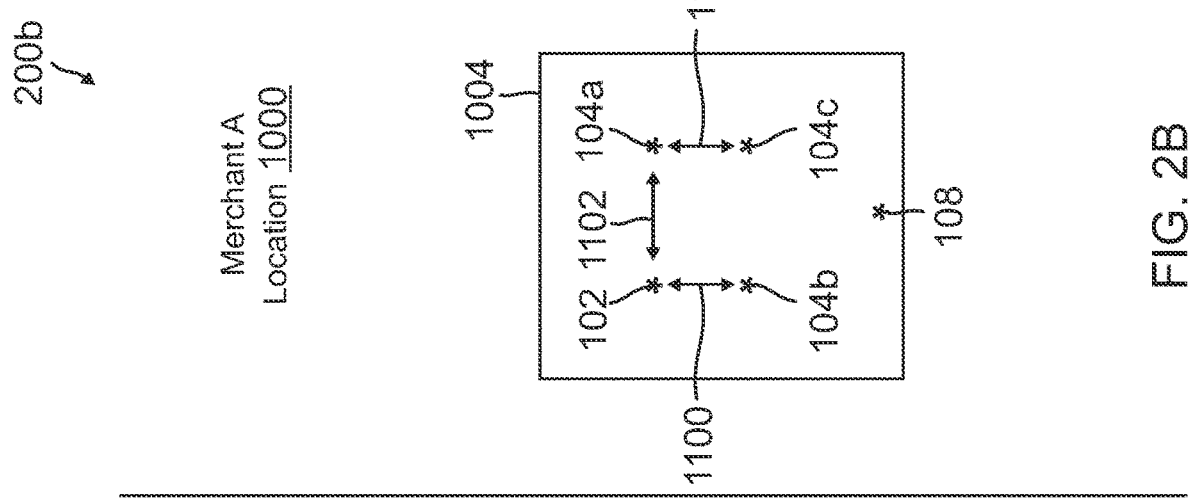
FIG. 2B is an exemplary system environment having messaging and data sharing connections within a geo-fenced area to identify users participating in a shared transaction, according to an embodiment.
Figure 2A:
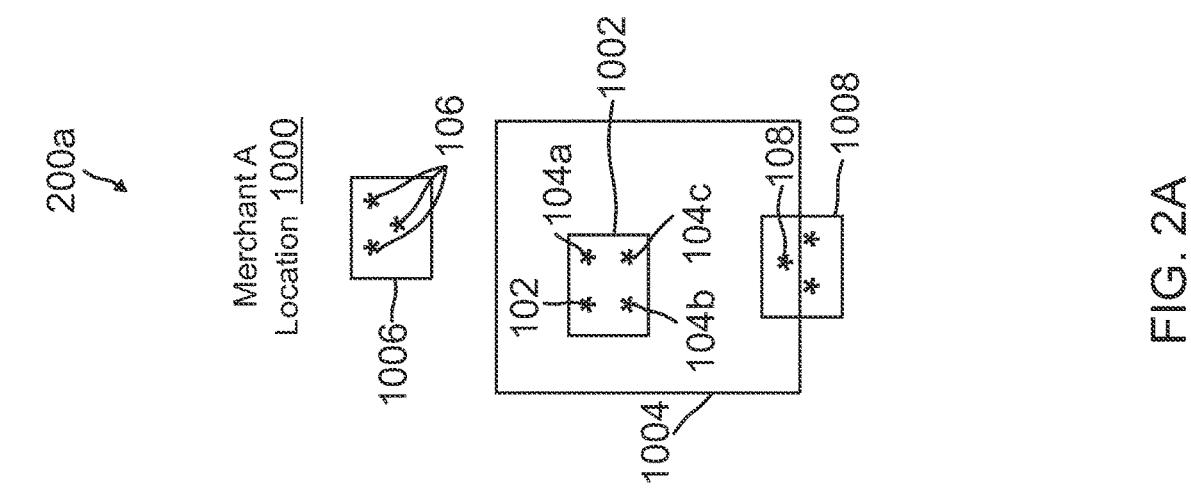
FIG. 2A is an exemplary user environment used to perform geo-fencing of geo-location data, according to an embodiment.

FIG. 2A is an exemplary user environment used to perform geo-fencing of geo-location data, according to an embodiment. Environment 200a includes a user 102 that may be in possession of a geo-location enabled device corresponding generally to the described features, processes, and components of first communication device 110 in system 100 of FIG. 1. In this regard, user 102 utilising the geo-location enabled device is shown through a detected geo-location symbol, where the symbol identifying user 102 displays a detected geo-location through the geo-location enabled device. The geo-location enabled device of user 102 may be used to pay for a shared transaction, where reimbursement is required by a portion of the users having their displayed geo-locations in environment 200*a*. Additionally, a user 140*a*, a user 104*b*, and a user 104*c* may all utilise geo-location enabled devices corresponding generally to the described features, processes, and components of second communication device 120 in system 100 of FIG. 1. Users 104*a-c* utilising their respective geo-location enabled device are shown through detected geo-location symbols, where the symbols identifying users 104*a-c* displays a detected geo-location through the geo-location enabled devices.

A merchant A location 1000 is shown in environment 200*a*, where merchant A location 1000 may correspond to a real-world physical location where user 102 may perform electronic transaction processing for a shared transaction between user 102 and users 104*a-c*. User 102 may complete electronic transaction processing for a shared transaction that requires repayment from users 104*a-c*, such as a purchase of a meal for user 102 and users 104*a-c* located at a table 1002 in merchant A location. Thus, a service provider may be required to determine other users sharing in the transaction for table 1002 so that data necessary to process the repayment or reimbursement transaction may be pushed to their device and used to automatically populate an application process and/or interface.

At merchant A location 1000 several users may be detected through geo-location enabled devices, user check-ins, or other location detection systems or services. In addition to user 102 and users 104*a-c*, users 106 and a user 108 may also be detected. User 102 and users 104*a-c* are shown as located at table 1002, which is within a geo-fence 1004 established at merchant A location 1000. A service provider may be unable to know the exact dimensions of table 1002, so may establish geo-fence 1004 as a probable area around user 102 where other users sharing in a shared transaction are likely to be located within. For example, geo-fence 1004 is large enough where user 102 and users 104*a-c* are within geo-fence 1004. However, users 106 located at a table 1006 are shown as sufficiently far from geo-fence 1004 that they are not within geo-fence 1004. That is, where geo-fence is kept small enough at merchant A location 1000, it does not capture every user within merchant A location 1000 that can be detected through a geo-location detection system. However, a table 1008 where user 108 is close enough to geo-fence 1004 that geo-fence 1004 includes user 108 based on geo-location data for user 108. Thus, the service provider may provide additional refinement to determine that only user 102 and users 104*a-c* share in the transaction for table 1002 based on the additional processed data shown in FIGS. 2B and 2C.

FIG. 2B is an exemplary system environment having messaging and data sharing connections within a geo-fenced area to identify users participating in a shared transaction, according to an embodiment. Environment 200*b* includes user 102 that may be in possession of a geo-location enabled device corresponding generally to the described features, processes, and components of first communication device 110 in system 100 of FIG. 1. In this regard, user 102 utilizing the geo-location enabled device is shown through a detected geo-location symbol, where the symbol identifying user 102 displays a detected geo-location through the geo-location enabled device. The geo-location enabled device of user 102 may be used to pay for a shared transaction, where reimbursement is required by a portion of the users having their displayed geo-locations in environment 200*b*. Additionally, users 140*a-c* may all utilize geo-location enabled devices corresponding generally to the described features, processes, and components of second communication device 120 in system 100 of FIG. 1. Users 104*a-c* utilizing their respective geo-location enabled device are shown through detected geo-location symbols, where the symbols identifying users 104*a-c* displays a detected geo-location through the geo-location enabled devices.

Merchant A location 1000 is shown in environment 200*b*, where merchant A location 1000 may correspond to a real-world physical location where user 102 may perform electronic transaction processing for a shared transaction between user 102 and users 104*a-c*. Merchant A location 1000 may correspond to the same location shown in environment 200*a* having geo-fence 1004. In order to provide a finer degree of refinement and granularity to data processing and identification of users sharing in a transaction, a service provider may process messaging chains, connections, and contacts as shown in environment 200*b* to determine whether users 104*a-c* and/or user 108 shared in the transaction paid for and processed by user 102. For example, geo-fence 1004 is shown as capturing user 102 with users 104*a-c* and user 108. However, user 108 did not share in the transaction. Thus, the service provider may be required to process additional social connections to determine that the transaction was only shared by user 102 with users 104*a-c*.

In this regard, the service provider may access contact, messaging, and/or social graph data for user 102, users 104*a-c*, and/or user 108. The service provider may process a first connection 1100 between user 102 and user 104*b* that links user 104*b* to user 102. Thus, the service provider may determine with a high degree of confidence that known contacts that message each other or otherwise are connected are sharing in a transaction at merchant A location 1000 when being located within geo-fence 1004 and user 102 has paid for a shared transaction. Similarly, user 104*a* may be linked to user 102 through a second connection 1102 that corresponds to a direct connection between user 102 and user 104*a*. However, user 102 and user 104*c* are not directly connected. Instead, user 104*c* is connected to user 104*a* but not user 102. This may occur with a new acquaintance or meeting between user 102 and user 104*c*. The service provider may process a third connection 1104 between user 104*a* and user 104*c*. Third connection 1104 may therefore link user 104*c* to user 102 through user 104*a* such that there is a chain of contacts, connections, or messages between user 102 and user 104*c* through user 104*a*. Thus, the service provider may determine that user 104*c* shared in the transaction by being within geo-fence 1004 at the time of the transaction and being linked to user 102 through user 104*a*. Additional chains may be used; however, the service provider may limit the number of chains or degree of separation to prevent too far removed contacts from being linked. Moreover, the service provider is able to eliminate user 108 from being considered as a transaction participant in the shared transaction as user 108 and user 102 do not share any direct or indirect (e.g., shared) connections.

FIG. 2C is an exemplary system environment using shared geo-location tracking data and movement to identify users participating in a shared transaction, according to an embodiment. Environment 200*c* includes user 102 that may be in possession of a geo-location enabled device corresponding generally to the described features, processes, and components of first communication device 110 in system 100 of FIG. 1. In this regard, user 102 utilising the geo-location enabled device is shown through a detected geo-location symbol, where the symbol identifying user 102 displays a detected geo-location through the geo-location enabled device. The geo-location enabled device of user 102 may be used to pay for a shared transaction, where reimbursement is required by a portion of the users having their displayed geo-locations in environment 200c. Additionally, users 140a-c may all utilize geo-location enabled devices corresponding generally to the described features, processes, and components of second communication device 120 in system 100 of FIG. 1. Users 104a-c utilising their respective geo-location enabled device are shown through detected geo-location symbols, where the symbols identifying users 104a-c displays a detected geo-location through the geo-location enabled devices.

Merchant A location 1000 is shown in environment 200c, where merchant A location 1000 may correspond to a real-world physical location where user 102 may perform electronic transaction processing for a shared transaction between user 102 and users 104a-c. Merchant A location 1000 may correspond to the same location shown in environments 200a and 200b. In order to provide a finer degree of refinement and granularity to data processing and identification of users sharing in a transaction, a service provider may further use geo-location tracked data over a period of time to determine if users share social or real-world characteristics, such as arrival or departure times at merchant A location 1000 that may indicate that users are travelling together and thus arrived at merchant A location 1000 to share in a transaction (e.g., share a meal at a restaurant). User 102 and users 104a-c may have their geo-locations tracked during an arrival time A 1200, where arrival time A 1200 corresponds to a point in time or time period that user 102 and user 104a-c shared travel together while arriving at merchant location 1000. The service provider may further track user 108's geo-locations over an arrival time B 1202, for example, when user 108 is near a merchant B location 1300 and travels to merchant A location 1000. Since arrival time A 1200 includes users 102 and user 104a-c but does not include user 108, who has a separate arrival time B 1202, the service provider may determine that only user 102 and users 104a-c share in the transaction at merchant A location 1000 and user 108 is separate from the group of users in the transaction at merchant A location 1000.

Figure 3:
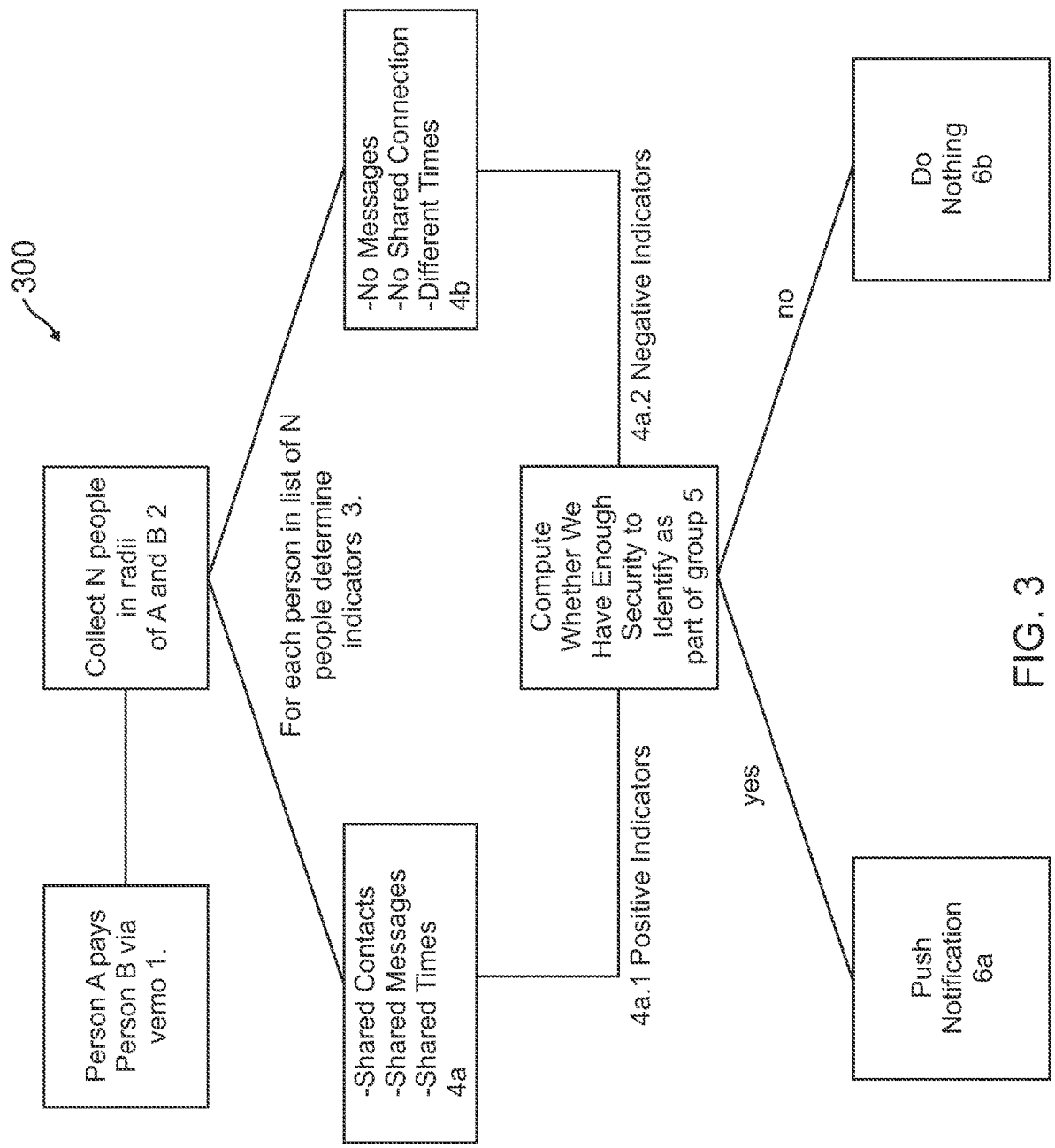
FIG. 3 is an exemplary flowchart for determination of user identifications for shared data processing, according to an embodiment.

FIG. 3 is an exemplary flowchart for determination of user identifications for shared data processing, according to an embodiment. Note that one or more steps, processes, and methods described herein may be omitted, performed in a different sequence, or combined as desired or appropriate.

Flowchart 300 shows an exemplary process for a service provider to determine whether to push data to a device of another user based on the other user sharing in a transaction with a first person A that pays for the transaction to a person B at step 1. After step 1, N people are collected within first and second radii around person A and person B at step 2. The area determined for the geo-fence to collect the N people may be set by the service provider for the location based on the location and/or geo-graphic or location specific information. Once the N people are collected, at step 3 for each person in the list of N people, the service provider may determine indicators that can be used to determine whether each of the N people share in the transaction by person A to person B.

For example, in step 4a, the service provider calculates or determines positive indicators that suggest that the person shares in the transaction with person A. These positive indicators may include shared contacts, shared messages, and/or shared times of co-locating, arrival, and/or departure. Conversely, in step 4b, the service provider calculates or determines indicators that suggest that the person in the list of N people within the first and second radii around person A and/or person B did not share in the transaction by person A to person B. These negative indicators may include no transmitted messages between the person and person A, no shared connections or other social links between the person in the list and person A, or different times of co-locating, arrival and/or departure than person A to the location or within the geo-fence. The positive indicators may be collected and measured in step 4a1 while the negative indicators are similarly collected and measured in step 4a2.

At step 5, the service provider may compute whether there is enough security or confidence that each person in the list of N people in radii to person A and person B can be identified as part of the group with person A that shared in the transaction. For example, if the positive indicators indicate that a person in the list of N people is connected to, has messages, and/or has arrived at the same time as person A to the location or within the geo-fence, then the service provider may proceed to step 6a where a push notification is transmitted to the person's device that includes information necessary to process a reimbursement transaction to person A. However, if the negative indicators indicate that there are no messages, no shared connections, and/or have different arrival times, then the service provider may proceed to step 6b where nothing occurs and the person's device does not receive any data as the person is unlikely to have shared in the transaction.

Figure 4:
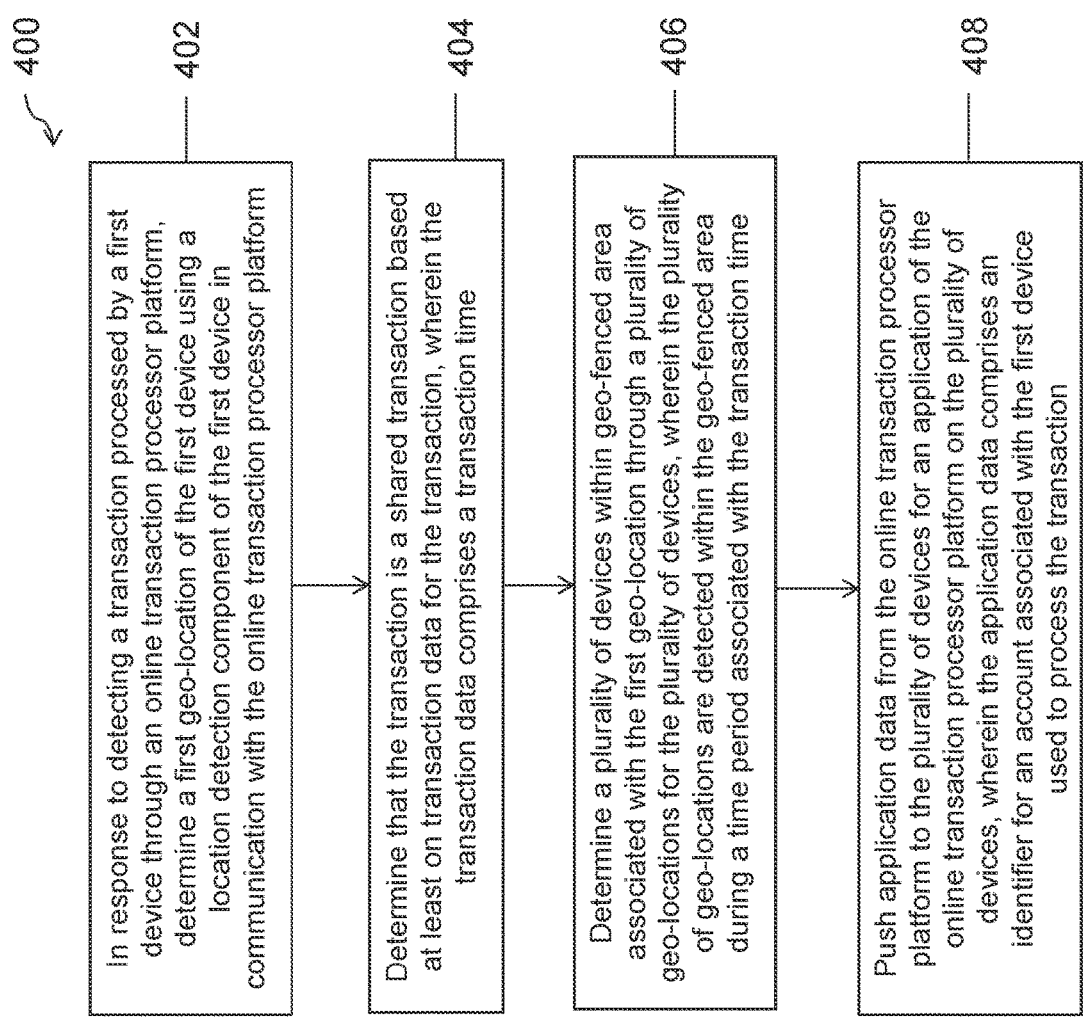
FIG. 4 is a flowchart of an exemplary process for time sensitive geo-location data for push notifications after shared transaction processing, according to an embodiment.

FIG. 4 is a flowchart of an exemplary process for time sensitive geo-location data for push notifications after shared transaction processing, according to an embodiment. Note that one or more steps, processes, and methods described herein may be omitted, performed in a different sequence, or combined as desired or appropriate.

At step 402 of flowchart 400, in response to detecting a transaction processed by a first device through an online transaction processor platform, a first geo-location of the first device is determined using a location detection component of the first device in communication with the online transaction processor platform. At step 404 of flowchart 400, it is determined that the transaction is a shared transaction based at least on transaction data for the transaction, wherein the transaction data comprises a transaction time. The transaction may also be determined to be shared due to at least one of a price of the transaction, the time of the transaction, behavioral data for a first user associated with the first device, a merchant location for the transaction, or a number of items in the transaction.

The online transaction processor platform may further provide a mobile transfer application process through the application. This process may detect an initial transfer transaction from a second device to a first device processing the shared transaction using the mobile transfer application process, wherein the initial transfer transaction occurs within the geo-fenced area of the first device during a time period associated with the transaction time. Thus, determining that the transaction is the shared transaction may further use the initial transfer transaction. This reimbursement transaction may be done through the online transaction processor such that the online transaction processor can detect the reimbursement transaction and use the transaction data to determine the shared transaction and other transaction participants.

A plurality of devices within a geo-fenced area associated with the first geo-location are determined through a plurality of geo-locations for the plurality of devices, wherein the plurality of geo-locations are detected within the geo-fenced area during a time period associated with the transaction time, at step 406 of flowchart 400. In order to establish the geo-fence, this may include querying the first device for the first geo-location at the transaction time and establishing a proximity range around the first geo-location as the geo-fence based on a merchant location layout factor surrounding the first geo-location. The plurality of devices may also be narrowed down using connection of contact data, which may comprise at least one of social contacts of the plurality of devices or users for the devices, data messages by the plurality of devices/users, previous messaging contacts by the plurality of devices/users, or shared contacts by the plurality of devices/users.

Determining the devices may include mining geo-location data for the transaction time, such as during the time period, wherein the geo-location data comprises a plurality of geo-locations during a time period and determining whether and of the plurality of geo-locations share an arrival time within the geo-fenced area during the time period. Additionally, devices that both open their respective application from the online transaction processor platform and navigate to a matching interface during the time period within the geo-fenced area may be used to determine that the devices are attempting a repayment to the first device, and therefore are part of the plurality of devices. Devices may also be determined to be matching or sharing in the shared transaction by determining previous transactions performed by the first device using a transaction history of the first device and determining whether the first device previously performed any of the previous transactions with the plurality of devices.

In various embodiments, determining the plurality of devices may comprise accessing contact data for a first user associated with the first device, wherein the contact data comprises online social contacts of the first user on a social networking platform and determining a shared contact between the first user and a second user using the contact data, wherein the second user is not within the online social contacts for the first user, and wherein the second user is associated with a second geo-location during the time period associated with the transaction time. This may also be done through electronic messages sent or received by the first device and linking the first device to the plurality of devices based on a shared connection in the electronic messages that is messaged by the first device and the plurality of devices. Once the shared contact is determined, a second device for the second user using the social networking platform is determined through the shared contact, wherein the second device comprises one of the plurality of devices. Determining the shared contact may comprise determining a social networking tag of the first user and the second user in online posted data of the shared contact, wherein the online posted data comprises one of an image, a video, a social network post with a tagged location within the geo-fenced area, or a microblogging post with the tagged location. Additionally, determining the second device may use at least one of a matching arrival time of the first user and the second user using the geo-location data, a messaging exchange between the first user and the second user, or second contact data for the second user.

Application data is pushed from the online transaction processor platform to the plurality of devices for an application of the online transaction processor platform on the plurality of devices, wherein the application data comprises an identifier for an account associated with the first device used to process the transaction, at step 408 of flowchart 400. This may include automatically populating the data in an interface or process of an instance of the online transaction processor platform's application executing on each of the plurality of devices. The data populated in the interface/process may include an identifier that identifies an account and an identity of the first user. A transaction processing request for an amount associated with the shared transaction may be received from a second device through input to the application, wherein the transaction processing request comprises a second identifier used by the second device with the online transaction processor platform. In response, an account transfer transaction for the amount using the second identifier and the account of the first user.

Populating data in the interface through the application data that is pushed to the plurality of device may include displaying at least a portion of the transaction data for the shared transaction, wherein the at least the portion of the transaction data comprises an split portion of an amount for the processed and shared transaction in a first interface element of interfaces for the plurality of devices (e.g., instances of an application executed on the plurality of device). Additionally, a second interface element may be activated that adjusts the split portion of the amount in the first interface element.

Figure 5:
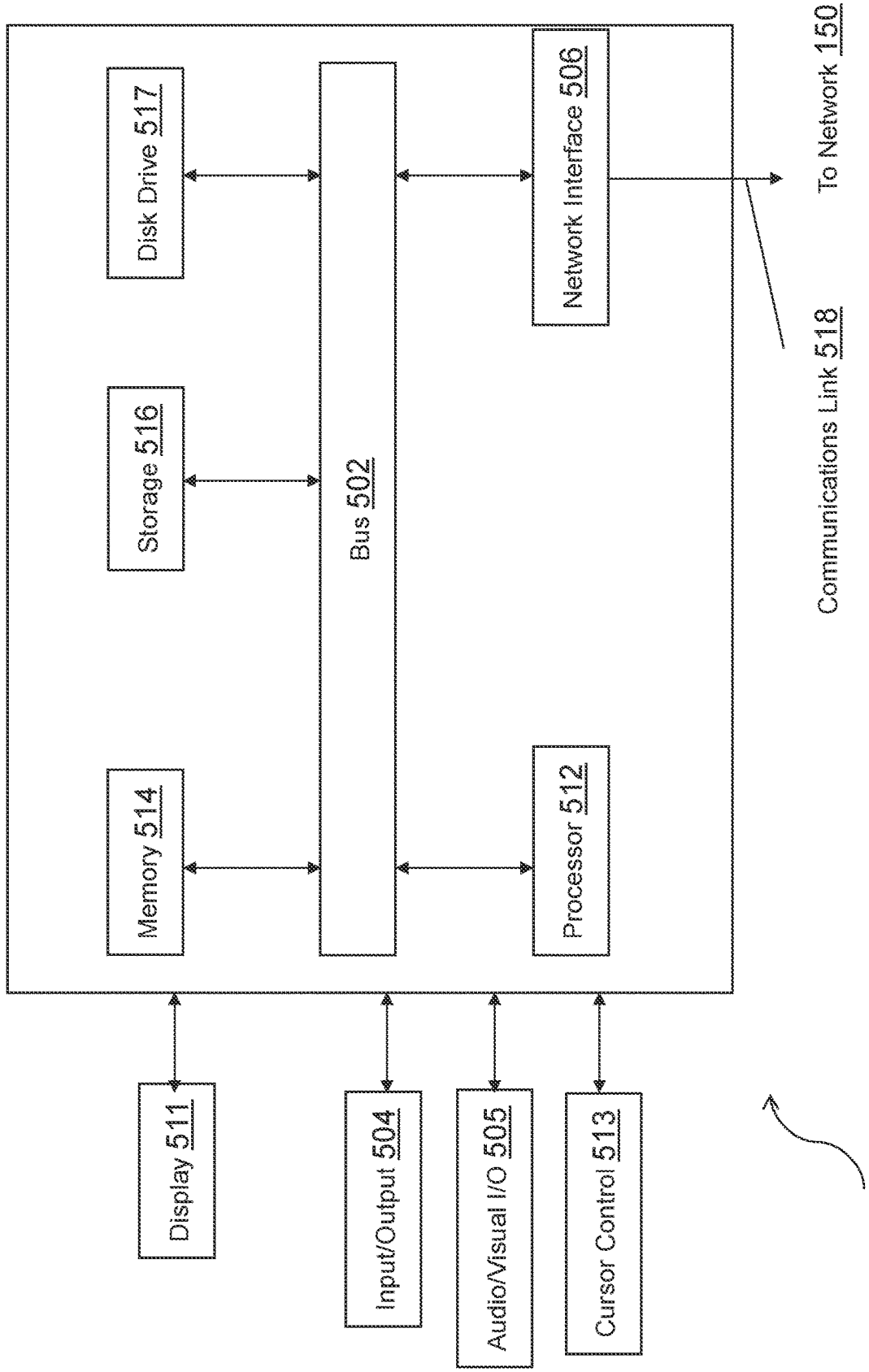
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   detecting a transaction processed by a first device through an online transaction processor platform;
   determining a first geo-location of the first device using a location detection component of the first device in communication with the online transaction processor platform;
   determining that the transaction is a shared transaction based at least on transaction data for the transaction, wherein the transaction data comprises a transaction time;
   determining a plurality of devices within a geo-fenced area associated with the first geo-location through a plurality of geo-locations for the plurality of devices, wherein the plurality of geo-locations are detected within the geo-fenced area during a time period associated with the transaction time;
   detecting, user application inputs associated with one or more mobile applications on the plurality of devices within the geo-fenced area;
   determining, based on the user application inputs, users that are interacting with the one or more mobile applications during the transaction time in the geo-fenced area;
   determining a subset of devices from the plurality of devices that are associated with the transaction based on the users that are interacting with the one or more mobile applications;
   pushing application data from the online transaction processor platform to the subset of devices via an application of the online transaction processor platform on the subset of devices, wherein the application data comprises an identifier for an account associated with the first device used to process the transaction; and
   navigating, based on a detected opening of the application on one of the subset of devices, the application on the one of the subset of devices to an application interface associated with the application data.

2. The system of claim 1, wherein the online transaction processor platform further provides a mobile transfer application process through the application, and
   wherein prior to determining that the transaction is the shared transaction, the operations further comprise:
   detecting an initial transfer transaction from a second device to the first device using the mobile transfer application process, wherein the initial transfer transaction occurs within the geo-fenced area of the first device during the time period associated with the transaction time, wherein the determining that the transaction is the shared transaction further uses the initial transfer transaction.

3. The system of claim 1, wherein the determining the plurality of devices comprises:
   accessing contact data for a first user associated with the first device, wherein the contact data comprises online social contacts of the first user on a social networking platform;

determining a shared contact between the first user and a second user using the contact data, wherein the second user is not within the online social contacts for the first user, and wherein the second user is associated with a second geo-location during the time period associated with the transaction time; and determining a second device for the second user using the social networking platform, wherein the second device comprises one of the plurality of devices.

4. The system of claim 3, wherein the determining the shared contact comprises determining a social networking tag of the first user and the second user in online posted data of the shared contact, wherein the online posted data comprises one of an image, a video, a social network post with a tagged location within the geo-fenced area, or a microblogging post with the tagged location.

5. The system of claim 1, wherein the online transaction processor platform further provides a mobile transfer application process through the application, and wherein prior to determining that the transaction is the shared transaction, the operations further comprise:

detecting an initial transfer transaction from a second device to the first device using the mobile transfer application process, wherein the initial transfer transaction includes a transfer of account credentials and identification information.

6. The system of claim 5, wherein the transfer of account credentials includes an issuance of a token used by the system that authenticates a first user of the first device.

7. The system of claim 1, wherein the online transaction processor platform further provides a mobile transfer application process through the application, and wherein prior to determining that the transaction is the shared transaction, the operations further comprise:

detecting an initial transfer transaction request pushed from a second device to the first device for sharing contact and geo-location data.

8. A method comprising:

detecting a transaction processed by a first device through an online transaction processor platform;

determining a first geo-location of the first device using a location detection component of the first device in communication with the online transaction processor platform;

determining that the transaction is a shared transaction based at least on transaction data for the transaction, wherein the transaction data comprises a transaction time;

determining a plurality of devices within a geo-fenced area associated with the first geo-location through a plurality of geo-locations for the plurality of devices, wherein the plurality of geo-locations are detected within the geo-fenced area during a time period associated with the transaction time;

detecting, during the time period, user input activity in one or more mobile applications on the plurality of devices within the geo-fenced area associated with the first geo-location;

determining, based on the user input activity, user interactions with the one or more mobile applications during the transaction time in the geo-fenced area;

determining a subset of devices from the plurality of devices that are associated with the transaction within the geo-fenced area based on the user interactions;

pushing application data from the online transaction processor platform to the subset of devices via an application of the online transaction processor platform on the subset of devices, wherein the application data comprises an identifier for an account associated with the first device used to process the transaction; and causing the application on the one of the subset of devices to present an application interface associated with the application data.

9. The method of claim 8, wherein the online transaction processor platform further provides a mobile transfer application process through the application, and wherein prior to determining that the transaction is the shared transaction, the method further comprises:

detecting an initial transfer transaction from a second device to the first device using the mobile transfer application process, wherein the initial transfer transaction occurs within the geo-fenced area of the first device during the time period associated with the transaction time, wherein the determining that the transaction is the shared transaction further uses the initial transfer transaction.

10. The method of claim 8, wherein the determining the plurality of devices comprises:

accessing contact data for a first user associated with the first device, wherein the contact data comprises online social contacts of the first user on a social networking platform;

determining a shared contact between the first user and a second user using the contact data, wherein the second user is not within the online social contacts for the first user, and wherein the second user is associated with a second geo-location during the time period associated with the transaction time; and determining a second device for the second user using the social networking platform, wherein the second device comprises one of the plurality of devices.

11. The method of claim 10, wherein the determining the shared contact comprises determining a social networking tag of the first user and the second user in online posted data of the shared contact, wherein the online posted data comprises one of an image, a video, a social network post with a tagged location within the geo-fenced area, or a microblogging post with the tagged location.

12. The method of claim 8, wherein the online transaction processor platform further provides a mobile transfer application process through the application, and wherein prior to determining that the transaction is the shared transaction, the method further comprises:

detecting an initial transfer transaction from a second device to the first device using the mobile transfer application process, wherein the initial transfer transaction includes a transfer of account credentials and identification information.

13. The method of claim 12, wherein the transfer of account credentials includes an issuance of a token used by the online transaction processor platform that authenticates a first user of the first device.

14. The method of claim 8, wherein the online transaction processor platform further provides a mobile transfer application process through the application, and wherein prior to determining that the transaction is the shared transaction, the method further comprises:

detecting an initial transfer transaction request pushed from a second device to the first device for sharing contact and geo-location data.

15. A non-transitory machine-readable medium having stored thereon machine-readable instructions executable to cause a machine to perform operations comprising:

in response to detecting a transaction processed by a first device through an online transaction processor platform, determining a first geo-location of the first device using a location detection component of the first device in communication with the online transaction processor platform;

determining that the transaction is a shared transaction based at least on transaction data for the transaction, wherein the transaction data comprises a transaction time;

determining a plurality of devices within a geo-fenced area associated with the first geo-location through a plurality of geo-locations for the plurality of devices, wherein the plurality of geo-locations are detected within the geo-fenced area during a time period associated with the transaction time;

detecting, during the time period, one or more user inputs or one or more user navigations in one or more mobile application on the plurality of devices within the geo-fenced area associated with the first geo-location;

determining, based on the one or more user inputs or the one or more user navigations, application interactions by users with the one or more mobile applications during the transaction time in the geo-fenced area;

determining a subset of devices from the plurality of devices that are associated with the transaction within the geo-fenced area based on the application interactions by the users;

pushing application data from the online transaction processor platform to the subset of devices via an application of the online transaction processor platform on the subset of devices, wherein the application data comprises an identifier for an account associated with the first device used to process the transaction; and causing an application interface associated with the application data to be displayed in the application on one of the subset of devices.

16. The non-transitory machine-readable medium of claim 15, wherein the online transaction processor platform further provides a mobile transfer application process through the application, and wherein prior to determining that the transaction is the shared transaction, the operations further comprise:

detecting an initial transfer transaction from a second device to the first device using the mobile transfer application process, wherein the initial transfer transaction occurs within the geo-fenced area of the first device during the time period associated with the transaction time, wherein the determining that the transaction is the shared transaction further uses the initial transfer transaction.

17. The non-transitory machine-readable medium of claim 15, wherein the determining the plurality of devices comprises:

accessing contact data for a first user associated with the first device, wherein the contact data comprises online social contacts of the first user on a social networking platform;

determining a shared contact between the first user and a second user using the contact data, wherein the second user is not within the online social contacts for the first user, and wherein the second user is associated with a second geo-location during the time period associated with the transaction time; and determining a second device for the second user using the social networking platform, wherein the second device comprises one of the plurality of devices.

18. The non-transitory machine-readable medium of claim 17, wherein the determining the shared contact comprises determining a social networking tag of the first user and the second user in online posted data of the shared contact, wherein the online posted data comprises one of an image, a video, a social network post with a tagged location within the geo-fenced area, or a microblogging post with the tagged location.

19. The non-transitory machine-readable medium of claim 15, wherein the online transaction processor platform further provides a mobile transfer application process through the application, and wherein prior to determining that the transaction is the shared transaction, the operations further comprise:

detecting an initial transfer transaction from a second device to the first device using the mobile transfer application process, wherein the initial transfer transaction includes a transfer of account credentials and identification information.

20. The non-transitory machine-readable medium of claim 19, wherein the transfer of account credentials includes an issuance of a token used by the online transaction processor platform authenticates a first user of the first device.

* * * * *